(12) United States Patent
Walker et al.

(10) Patent No.: US 11,766,651 B1
(45) Date of Patent: Sep. 26, 2023

(54) PASSIVELY PUMPED, POLYCRYSTALLINE CERAMIC HIGH AND ULTRA-HIGH VACUUM CHAMBERS

(71) Applicant: National Technology & Engineering Solutions of Sandia, LLC, Albuquerque, NM (US)

(72) Inventors: Charles A. Walker, Albuquerque, NM (US); Peter D. D. Schwindt, Albuquerque, NM (US); Grant Biedermann, Albuquerque, NM (US); Dennis J. De Smet, Bosque Farms, NM (US); Jongmin Lee, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 843 days.

(21) Appl. No.: 16/840,637

(22) Filed: Apr. 6, 2020

(51) Int. Cl.
| | |
|---|---|
| *B01J 3/00* | (2006.01) |
| *B01J 3/03* | (2006.01) |
| *C03C 3/12* | (2006.01) |
| *F04D 19/04* | (2006.01) |
| *F16J 12/00* | (2006.01) |
| *G02B 1/11* | (2015.01) |

(52) U.S. Cl.
CPC ............... *B01J 3/006* (2013.01); *B01J 3/004* (2013.01); *B01J 3/03* (2013.01); *C03C 3/125* (2013.01); *F04D 19/04* (2013.01); *F16J 12/00* (2013.01); *G02B 1/11* (2013.01)

(58) Field of Classification Search
CPC .... B01J 3/004; B01J 3/006; B01J 3/03; C03C 3/125; F04D 19/04; F16J 12/00; G02B 1/11
See application file for complete search history.

(56) References Cited

U.S. PATENT DOCUMENTS 8,546,748 B2 10/2013 Hughes et al.

OTHER PUBLICATIONS

Jau, Y.-Y. et al., "Low-power, miniature 171Yb ion clock using an ultra-small vacuum package," Applied Physics Letters (2012) 101:253518, 4 pages.
Kasevich, M. et al., "Atomic Interferometry Using Stimulated Raman Transitions," Physical Review Letters (1991) 67 (2):181-184.
Phillips, W. D., "Laser cooling and trapping of neutral atoms," Reviews of Modern Physics (1998) 70(3):721-741.
(Continued)

*Primary Examiner* — Sean M Luck
(74) *Attorney, Agent, or Firm* — Mark A. Dodd

(57) ABSTRACT

A sealed, passively pumped, polycrystalline ceramic vacuum chamber and method for fabricating the chamber are disclosed. The body of the vacuum chamber is made from a polycrystalline ceramic, for example, alumina. The vacuum chamber includes one or more windows made from a transparent ceramic, for example, sapphire, to accommodate optical access, while remaining amorphous-glass free to minimize or eliminate helium permeation. The vacuum chamber components are joined via laser welding or furnace brazing and the completed chamber is bakeable at temperatures up to 400° C. The vacuum chamber can operate at high or ultra-high vacuum pressures for an extended period through the use of one or more getter-based pumps. The vacuum chamber may include one or more atomic sources depending upon the application.

20 Claims, 3 Drawing Sheets

(56) References Cited

OTHER PUBLICATIONS

Rushton, J. A. et al., "Contributed Review: The feasibility of a fully miniaturized magneto-optical trap for portable ultracold quantum technology," Review of Scientific Instruments (2014) 85:121501, 23 pages.

Schwindt, P. D. D. et al., "A highly miniaturized vacuum package for a trapped ion atomic clock," Review of Scientific Instruments (2016) 87:053112, 9 pages.

Scherer, D. R. et al., "Progress on a Miniature Cold-Atom Frequency Standard," arXiv: 1411.5006, Nov. 2014, 10 pages.

PASSIVELY PUMPED, POLYCRYSTALLINE CERAMIC HIGH AND ULTRA-HIGH VACUUM CHAMBERS

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to polycrystalline ceramic high and ultra-high vacuum chambers that employ passive pumping, i.e., are sealed and do not use an external pumping system, for use in systems requiring optical access.

BACKGROUND

High vacuum (HV) is defined as an absolute pressure range of $10^{-3}$ to $10^{-9}$ Torr, while ultra-high vacuum (UHV) corresponds to an absolute pressure range of $10^{-9}$ to $10^{-12}$ Torr. HV and UHV chambers are required to accomplish many scientific and engineering processes such as fabrication and manufacturing. Vacuum chambers, especially those operating in the pressure range of $10^{-7}$ Torr or less, are widely used in precision measurement and atomic sensor applications. The required HV or UHV is obtained and maintained by the physical removal of gas species using various methods of pumping. To maintain a specific level of vacuum, or absolute pressure, the speed of the gas removal, or pumping, must exceed the total rate of gas entering the vacuum chamber from external leaks as well as from gas evolving from the internal surfaces. External leaks can be in two forms, physical (or real) leaks, for example, a crack in a seal, or from permeation, for example, diffusion of a gas through the material used to form the vacuum chamber.

High-quality HV and UHV chambers are usually made from materials having limited gas permeation and assembled using processes that greatly minimize or eliminate external leaks. Gases from the internal volume and gases desorbed from the internal vacuum chamber surfaces are pumped away. Desorption is a slow process, and the rate of desorption is often increased by heating the vacuum chamber surfaces. Adequate HV or UHV levels may be achieved using less than ideal materials or fabrication techniques when the vacuum pumping components can remove more gas than enters the system through external (real) or internal (outgassing) leaks or permeation. The high pumping speeds of typical vacuum systems that use external or active-pumping allow less than optimum materials such as glasses and polymers to be used for viewports or diagnostic tools or sealing and still function adequately in systems requiring optical access.

Further, a number of HV and UHV applications require the use of magnetic fields. If these magnetic fields need to be turned on and off, especially at higher frequencies, a typical metallic vacuum chamber, for example, one formed of stainless steel, is not feasible. In particular, a typical metallic vacuum chamber may generate electrical eddy currents when the magnetic field is turned on or off, which will oppose the desired magnetic field, or introduce nascent fields of its own accord, thereby distorting the desired magnetic field. Thus, a nonmagnetic and electrically insulating vacuum chamber is required for these applications.

In summary, a number of HV and UHV chamber systems cannot afford the size, weight, fragility, and cost of an active pumping system with its pumps, valves, and manifolds, or the distorted magnetic fields caused by a typical metallic vacuum chamber. Thus, there exists a need for a passively pumped, nonmagnetic HV or UHV chamber that employs passive pumping, yet can still retain the required high or ultra-high vacuum levels for a sufficient duration.

SUMMARY

One aspect of the present invention relates to a passively pumped, nonmagnetic HV or UHV chamber made from a polycrystalline ceramic, for example, alumina. The vacuum chamber includes one or more transparent ceramic windows, for example, sapphire, to accommodate optical access while remaining completely amorphous-glass free to minimize or eliminate helium permeation. The vacuum chamber components are preferably joined via laser welding and furnace brazing and are bakeable at temperatures up to 400° C. Passive pumps, for example, getters, are utilized to maintain HV or UHV levels after the vacuum chamber has been baked at an elevated temperature, sufficiently evacuated, and separated from the active pumping system.

In at least one embodiment of the present invention, a sealed, passively pumped vacuum chamber comprises a body formed of a polycrystalline ceramic (the body including at least one window recess); and at least one window formed of a transparent ceramic (each window located in a corresponding window recess).

In various embodiments of the present invention: the polycrystalline ceramic used to form the body includes one of an oxide-based ceramic, a nitride-based ceramic, and a carbide-based ceramic; and the polycrystalline ceramic used to form the body includes 80-99.8% alumina.

In other embodiments of the present invention: the bottom of each window recess forms a slight angle with respect to a corresponding face of the body (the slight angle reducing optical reflections); the transparent ceramic used to form each window includes one of sapphire, aluminum oxynitride, yttrium oxide, and yttria-alumina garnet; each window includes an anti-reflection coating; and the sealed, passively pumped vacuum chamber further comprises at least one filler metal ring (each filler metal ring located in a corresponding window recess) or at least one window frame (each window frame located around a perimeter of a corresponding window) and at least one recess frame (each recess frame located in a corresponding window recess, each recess frame facing a corresponding window frame).

In yet other embodiments of the present invention: the sealed, passively pumped vacuum chamber further comprises at least one getter-based pump; each getter-based pump includes an alloy containing one or more of zirconium, aluminum, titanium, vanadium, and iron; the body further includes at least one port and each getter-based pump includes a corresponding tube body (each tube body located in a corresponding port); alternatively, each getter-based pump is adjacent to an inner surface of the body; and each getter-based pump being activated by electrical feedthroughs, induction, or light.

In still other embodiments of the present invention: the sealed, passively pumped vacuum chamber further comprises a pump out tube (the pump out tube for coupling to an external vacuum pumping system, the pump out tube being sealed), wherein the body further includes a port and the pump out tube is located in the port; and the pump out tube includes an oxygen-free high thermal conductivity (OFHC)

copper tube or a nickel tube; the pump out tube further includes a titanium sleeve (the titanium sleeve located around the exterior of a portion of the pump out tube); and the sealed, passively pumped vacuum chamber further comprises a lid, the body further including a port with the lid being solder sealed to the port.

In further embodiments of the present invention: the sealed, passively pumped vacuum chamber further comprises at least one atomic source, the body further including at least one port and each atomic source includes a corresponding tube body (each tube body located in a corresponding port); each atomic source includes one of aluminum (Al), argon (Ar), calcium (Ca), cesium (Cs), chromium (Cr), dysprosium (Dy), erbium (Er), francium (Fr), helium (He), indium (In), lithium (Li), magnesium (Mg), mercury (Hg), neon (Ne), potassium (K), rubidium (Rb), sodium (Na), strontium (Sr), xenon (Xe), ytterbium (Yb), diiodine ($I_2$), and disodium ($Na_2$); and each atomic source being activated by electrical feedthroughs, induction, or light.

In another embodiment of the present invention: the sealed, passively pumped vacuum chamber further comprises at least one of a getter-based pump and an atomic source, a high-temperature cofired ceramic (HTCC) (each of the at least one getter-based pump and atomic source being located adjacent the HTCC and being activated by metalized current paths within the HTCC), and a tube body (the HTCC being located in the tube body), wherein the body further includes a port and the tube body is located in the port.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Exemplary Chamber Design

Figure 1A:
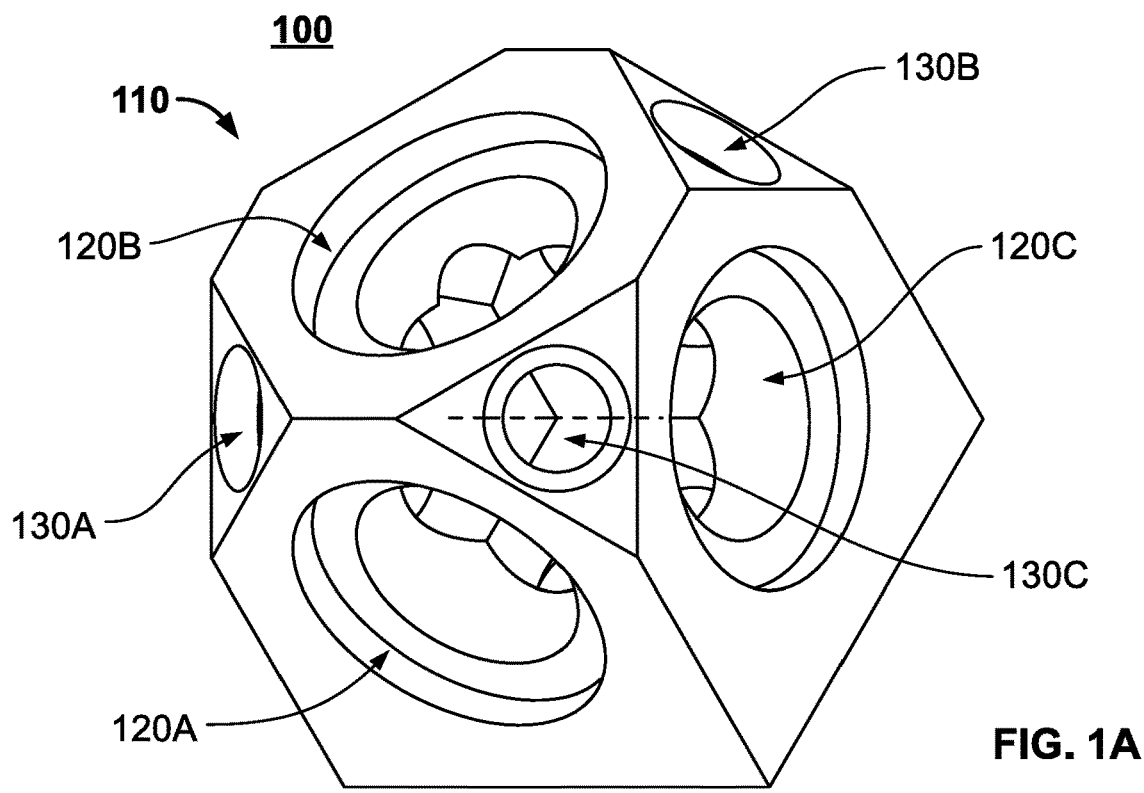
FIGS. 1A and 1B illustrate a vacuum chamber in accordance with one or more embodiments of the present invention.
Figure 1B:
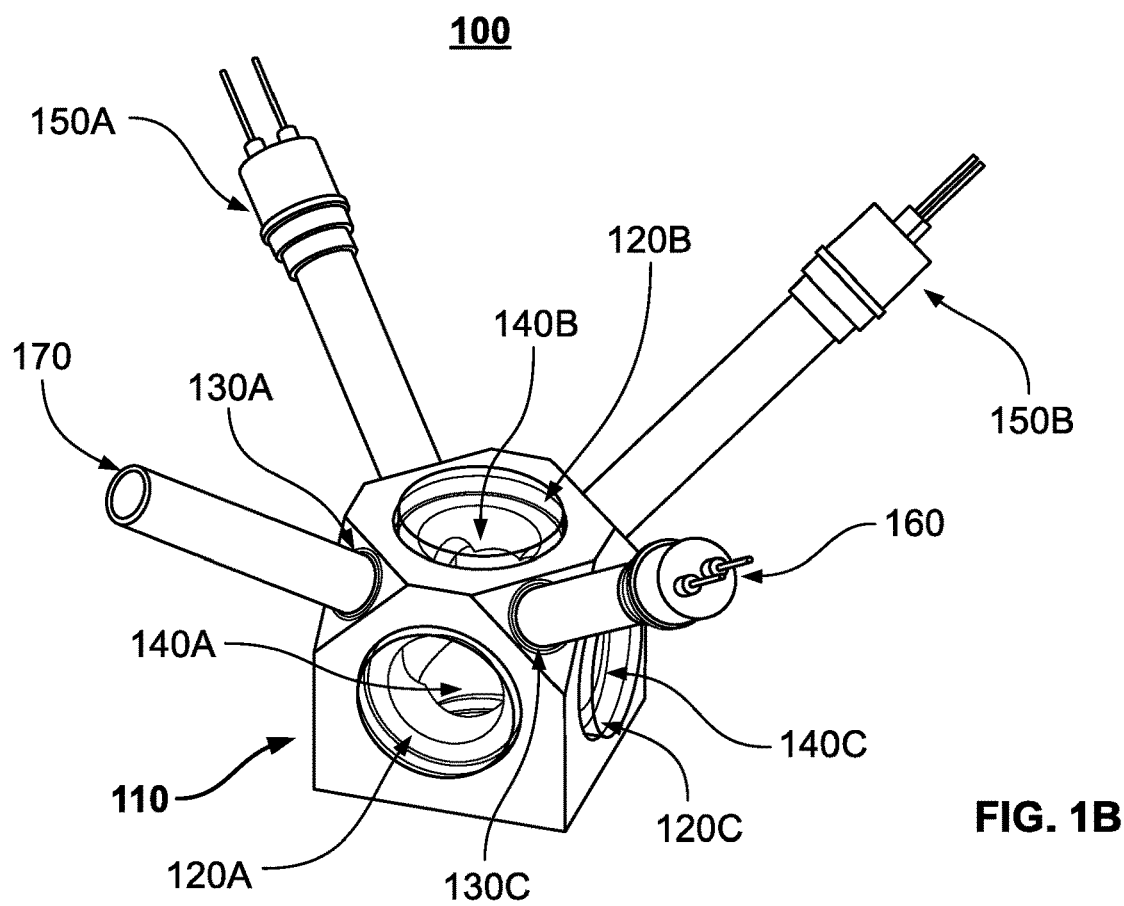

FIGS. 1A and 1B illustrate a passively pumped vacuum chamber 100 in accordance with at least one embodiment of the present invention. As illustrated in FIG. 1A, the vacuum chamber 100 includes a body 110 with six window recesses, though only three window recesses 120A-120C are clearly illustrated. The body 110 further includes four ports, though only three ports 130A-130C are clearly illustrated. FIG. 1B illustrates the body 110 with windows 140A-140C located in corresponding window recesses 120A-120C. FIG. 1B also illustrates two getter-based pumps 150A, 150B located in corresponding ports (the first being unlabeled), 130B, an atomic source 160 located in corresponding port 130C, and a pump out tube 170 located in a corresponding port 130A.

In various embodiments of the present invention, the body 110 is formed of a polycrystalline ceramic. For example, the body 110 formed of a polycrystalline ceramic is preferably formed of alumina, with 80-99.8% alumina more preferable, though other polycrystalline ceramics, such as silicon nitride, aluminum nitride, steatite (MgO—$SiO_2$), or other oxide, nitride, or carbide-based polycrystalline ceramics may be used.

In at least one embodiment of the present invention, the bottoms of the window recesses 120A-120C are formed at a slight angle, for example 2°, relative to the corresponding faces of the body 110. When windows 140A-140C are located in their corresponding window recesses 120A-120C, the slight angle of the window recesses 120A-120C, and thus the slight angle of the windows 140A-140C themselves, helps to reduce optical reflections from and within the body 110.

In at least one embodiment of the present invention, the windows 140A-140C are preferably formed of sapphire, a transparent ceramic, with C-cut sapphire being more preferable to maintain the polarization of the transmitted light. In other embodiments of the present invention, other materials that are optically transparent at the operating wavelength may be employed if their permeation rate for helium and other light gases is sufficiently low. The alternative window materials include, for example, various transparent ceramics, such as aluminum oxynitride, yttrium oxide, and yttria-alumina garnet. Fused silica, borosilicate glass, and soda lime glass cannot be used as their helium permeation is too high. Sapphire offers the added benefit that it is commonly brazed to alumina. To improve the optical performance of the vacuum chamber 100, the windows 140A-140C are preferably anti-reflection (AR) coated. One concern with AR coated windows 140A-140C is that the AR coating may be degraded due to the high temperatures of the brazing process used to build the vacuum chamber 100. In these cases, the AR coating may need to be deposited after the brazing process.

While the vacuum chamber 100 illustrated in FIG. 1 includes six window recesses, of which only three window recesses 120A-120C are clearly illustrated, the vacuum chamber 100 may have as few as a single window recess 120 and corresponding window 140 depending upon the application. The number of window recess(es) 120 and corresponding window(s) 140 will be a design choice, with fewer window recess(es) 120 and corresponding window(s) 140 resulting in few potential sources of vacuum leaks. Thus, the number of window recess(es) 120 and corresponding window(s) 140 is preferably minimized for the given application.

Figure 2:
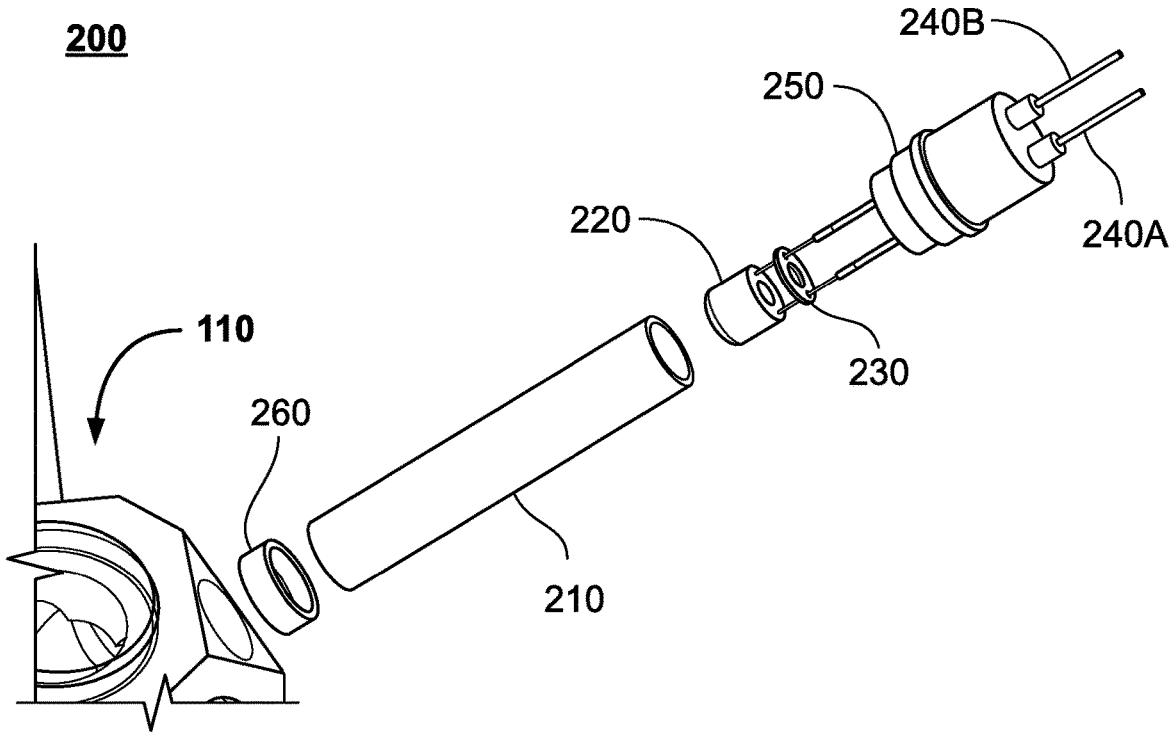
FIG. 2 illustrates an exemplary getter-based pump in accordance with one or more embodiments of the present invention.

An exemplary getter-based pump 200 is illustrated in FIG. 2. The getter-based pump 200 includes a tube body 210 that surrounds the remaining elements of the getter-based pump 200. The tube body 210 may be formed of titanium or a polycrystalline ceramic. The getter-based pump 200 also includes the getter material 220, which, when a gas molecule strikes it, combine, either chemically or by absorption. The getter material 220 is activated by heating it with a heater (not illustrated) internal to the getter material 220. The power to the heater is supplied via two electrical feedthrough wires 240A, 240B passing through a cap 250 and insulated from the tube body 210 by an optional alumina spacer 230, especially if the tube body 210 is formed of titanium. A getter-based pump sleeve 260 is optionally employed and would be located around the tube body 210 to facilitate brazing of the getter-based pump 200 to the body 110. The optional getter-based pump sleeve 260 is preferably formed of titanium or a polycrystalline ceramic. The getter material 220 may include, for example, an alloy containing one or more of zirconium, aluminum, titanium, vanadium, and iron. As will be appreciated by those of ordinary skill in the art, some components of the getter-based pump 200 may be procured commercially, while other components may need to be fabricated specifically for the getter-based pump 200.

While the vacuum chamber 100 illustrated in FIG. 1 includes a pair of getter-based pumps 150A, 150B, the vacuum chamber 100 may have a single getter-based pump 150 or have more than two getter-based pumps 150. The number of getter-based pumps 150 will be a design choice, with more getter-based pumps 150 potentially enabling a longer operational time or operation at a greater vacuum level (lower base pressure). By increasing the number of getter-based pumps 150, the vacuum chamber 100 may also be operated in the presence of a greater gas load. The number of ports 130 in the body 110 may need to be altered depending upon the number of getter-based pumps required 150, either through adding or deleting ports 130, or covering unused ports 130 with a plug (not illustrated).

While the getter-based pump 200 illustrated in FIG. 2 employs a tube body 210, the getter material 220, and two electrical feedthrough wires 240A, 240B, alternative getter-based pumps may be employed in other embodiments of the present invention. For example, the getter-based pump could include sputtered or evaporated materials, such as a titanium sublimation pump, or the getter materials may be deposited on the walls of the body 110. Some of these alternative getter-based pumps provide the benefit of not requiring a separate port 130 for mounting, thereby eliminating a potential leak source. Some of these alternative getter-based pumps provide the additional benefit of not including or requiring internal heaters.

Figure 3:
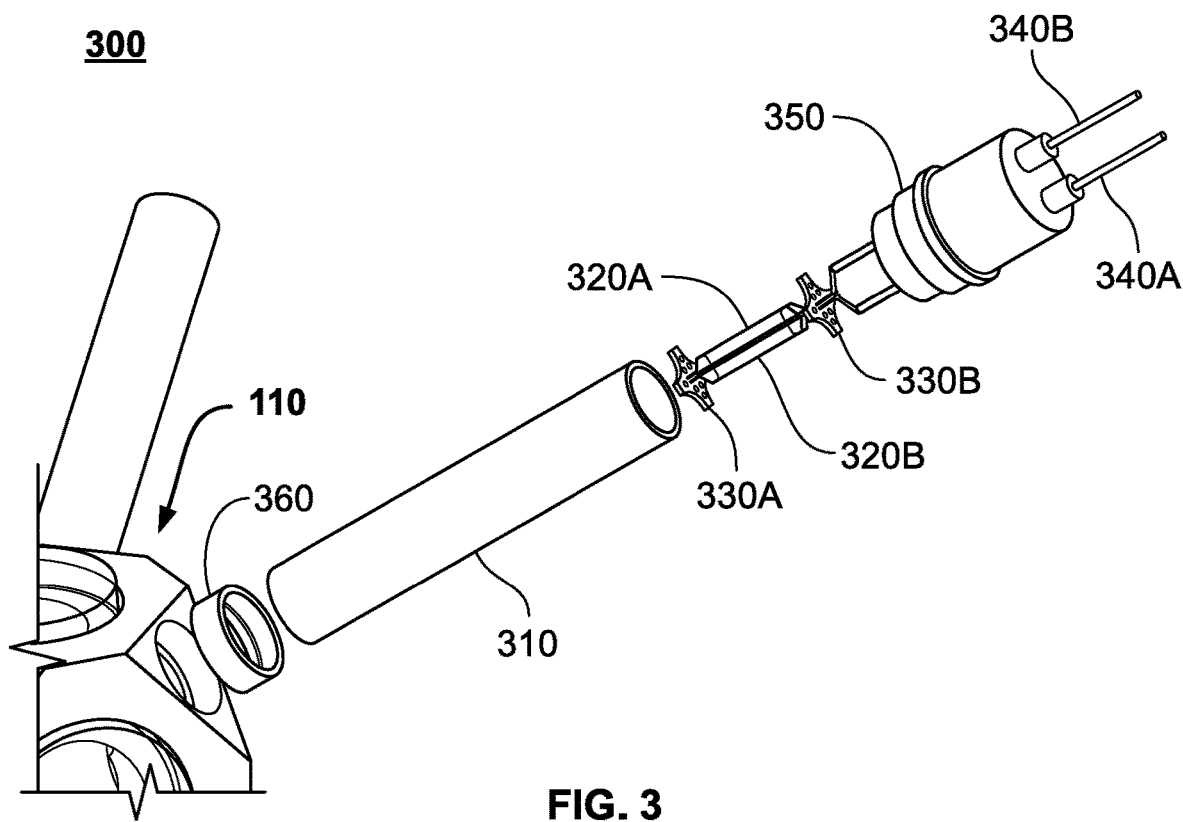
FIG. 3 illustrates an exemplary atomic source in accordance with one or more embodiments of the present invention.

An exemplary atomic source 300 is illustrated in FIG. 3. The atomic source 300 includes a tube body 310 that surrounds the remaining elements of the atomic source 300. The tube body 310 may be formed of titanium or a polycrystalline ceramic. The atomic source 300 also includes at least one atomic dispenser 320A, 320B for dispensing the desired atomic element. Exemplary atomic elements include aluminum (Al), argon (Ar), calcium (Ca), cesium (Cs), chromium (Cr), dysprosium (Dy), erbium (Er), francium (Fr), helium (He), indium (In), lithium (Li), magnesium (Mg), mercury (Hg), neon (Ne), potassium (K), rubidium (Rb), sodium (Na), strontium (Sr), xenon (Xe), and ytterbium (Yb). In addition, certain molecules instead of atoms may be used including, for example, diiodine ($I_2$) and disodium ($Na_2$). A pair of optional alumina spacers 330A, 330B keep the atomic dispensers 320A, 320B from touching the wall of the tube body 310, especially if the tube body 310 is formed of titanium. The atomic dispensers 320A, 320B are activated by heat, created when power is supplied via two electrical feedthrough wires 340A, 340B passing through a cap 350. An atomic source sleeve 360 is optionally employed and would be located around the body tube 310 to facilitate brazing of the atomic source 300 to the body 110. The optional atomic source sleeve 360 is preferably formed of titanium or a polycrystalline ceramic. As will be appreciated by those of ordinary skill in the art, some components of the atomic source 300 may be procured commercially, while other components may need to be fabricated specifically for the atomic source 300.

While the vacuum chamber 100 illustrated in FIG. 1 includes a single atomic source 160, the vacuum chamber 100 may have zero, or two or more atomic sources 160. The number of atomic sources 160 will be a design choice, with more atomic sources 160 potentially enabling a longer operational time or operation at a higher atomic concentration, while no atomic sources 160 may be required in other applications. The number of ports 130 in the body 110 may need to be altered depending upon the number of atomic sources 160 required, either through adding or deleting ports 130, or covering unused ports 130 with a plug (not illustrated).

While both the getter-based pump 200 illustrated in FIG. 2 and the atomic source 300 illustrated in FIG. 3 employ electrical feedthrough wires 240A, 240B, 340A, 340B passing through a cap 250, 350, alternative configurations may be used in other embodiments of the present invention. For example, a high-temperature cofired ceramic (HTCC) may be used as an alternative to the cap 250, 350 and corresponding electrical feedthrough wires 240A, 240B, 340A, 340B. If the tube body 210, 310 of the getter-based pump 200 or atomic source 300 is formed of a polycrystalline ceramic, then this HTCC approach minimizes potential leaks as their coefficients of thermal expansion (CTE) will more closely match.

The use of a HTCC element permits various embodiments of the present invention to have different configurations for the vacuum chamber 100. For example, one or more getter-based pumps 150 and one or more atomic sources 160 can be placed on a single large multifunction HTCC element that has multiple metalized current paths through its body to allow electrical current to flow from the outside of the vacuum chamber 100 to the getter-based pump(s) 150 and atomic source(s) 160 inside the vacuum chamber 100. These multiple metalized current paths allow the getter-based pump(s) 150 and atomic source(s) 160 to be individually activated. The use of this multifunction HTCC element may eliminate one or more of the tube bodies 210, 310 and corresponding ports 130 required by the getter-based pump(s) 150 and atomic source(s) 160, thereby eliminating one or more potential leak sources. This multifunction HTCC element may also offer the benefit of a more compact design as the corresponding tube body can be shorter. Specifically, the multifunction HTCC element can be attached to the body tube via a metallic frame (preferably titanium) by welding, as opposed to requiring a higher temperature brazing process, though a brazing process could be employed (preferably a localized brazing process such as induction heating). Using this process, the getter-based pump(s) 150 and atomic source(s) 160 will be subjected to less heat. Thus, the getter-based pump(s) 150 and atomic source(s) 160 can be closer to the end of the tube body without being activated by the welding (or localized brazing), and a shorter overall tube body may be used.

In at least one embodiment of the present invention, the pump out tube 170 is preferably formed of copper, and more preferably formed of oxygen-free high thermal conductivity (OFHC) copper. The very low levels of oxygen in the OFHC copper helps to reduce the amount of potential oxygen outgassing. The pump out tube 170 also preferably includes a titanium pump out tube sleeve (not illustrated) to facilitate brazing of the pump out tube 170 to the body 110 of the vacuum chamber 100. The pump out tube sleeve is preferably laser welded to the OFHC copper tube portion of the pump out tube 170, with the pump out tube sleeve located around the exterior of a portion of the OFHC copper tube. The pump out tube 170 is ultimately sealed, preferably pinched off, after the passively pumped vacuum chamber 100 is pumped out by an external vacuum pumping system during fabrication. In other embodiments of the present invention, nickel may be used to form the pump out tube 170, though its use may not be compatible with applications that are sensitive to magnetic materials.

In various embodiments of the present invention, if one or more plugs are required to seal unused ports 130 of the body 110, the plug(s) are preferably formed of the same polycrystalline ceramic as the body 110, though they may also be formed of titanium. By forming the plug(s) out of the same material as the body 110, issues related to different CTEs as potential leak sources are minimized. As will be appreciated by those of ordinary skill in the art, a more generic design of the body 110 with ports 130 at each of the eight corners allows the greatest flexibility in terms of the number of getter-based pumps 150 and atomic sources 160, but may likely require the use of plugs. For a specific application in which the number of getter-based pump(s) 150 and atomic source(s) 160 is known, the design of the body 110 may include only the necessary number of ports 130 and no plugs will be required.

Where size and weight of the vacuum chamber are not as critical, an embodiment of the present invention includes a second outer body, thereby forming an overall double walled vacuum chamber, i.e., an inner vacuum chamber within an outer vacuum chamber. By pumping out both the inner and outer vacuum chambers, the operational time for a given vacuum level in the inner vacuum chamber will be increased as helium and other light gases that permeate the outer vacuum chamber wall, will still have to permeate the inner vacuum chamber wall to reach the interior of the inner vacuum chamber. As will be appreciated by those of ordinary skill in the art, getters may be used in both the inner and outer vacuum chambers, thereby further increasing the operational time for the inner vacuum chamber.

While the embodiment of the vacuum chamber 100 illustrated in FIG. 1 included two getter-based pumps 150A, 150B, other embodiments of the present invention may, in addition to or in the alternative, employ a miniature ion pump. As a miniature ion pump is larger than a getter-based pump 150, a vacuum chamber 100 employing a miniature ion pump will be larger and likely have higher power requirements than vacuum chambers employing just getter-based pumps 150.

As yet another alternative to the embodiment of the vacuum chamber 100 illustrated in FIG. 1 with its two getter-based pumps 150A, 150B, other embodiments of the present invention may employ inductive heating to activate the getter-based pump(s) 150. An advantage to this embodiment of the present invention is the reduction in the number of electrical feedthroughs into the vacuum chamber 100, as each electrical feedthrough is a possible leak source. In like manner, inductive heating may be used to activate the atomic source(s) 160 in some embodiments of the present invention, providing the same benefit of no electrical feedthroughs, and thus fewer potential leak sources. In still other embodiments of the present invention, the getter-based pump(s) 150 and/or the atomic source(s) 160 may be activated by light, for example, a laser beam, illuminating the getter material 220 or atomic dispenser 320, preferably through one of the windows 140.

Exemplary Vacuum Chamber Fabrication

Figure 4:
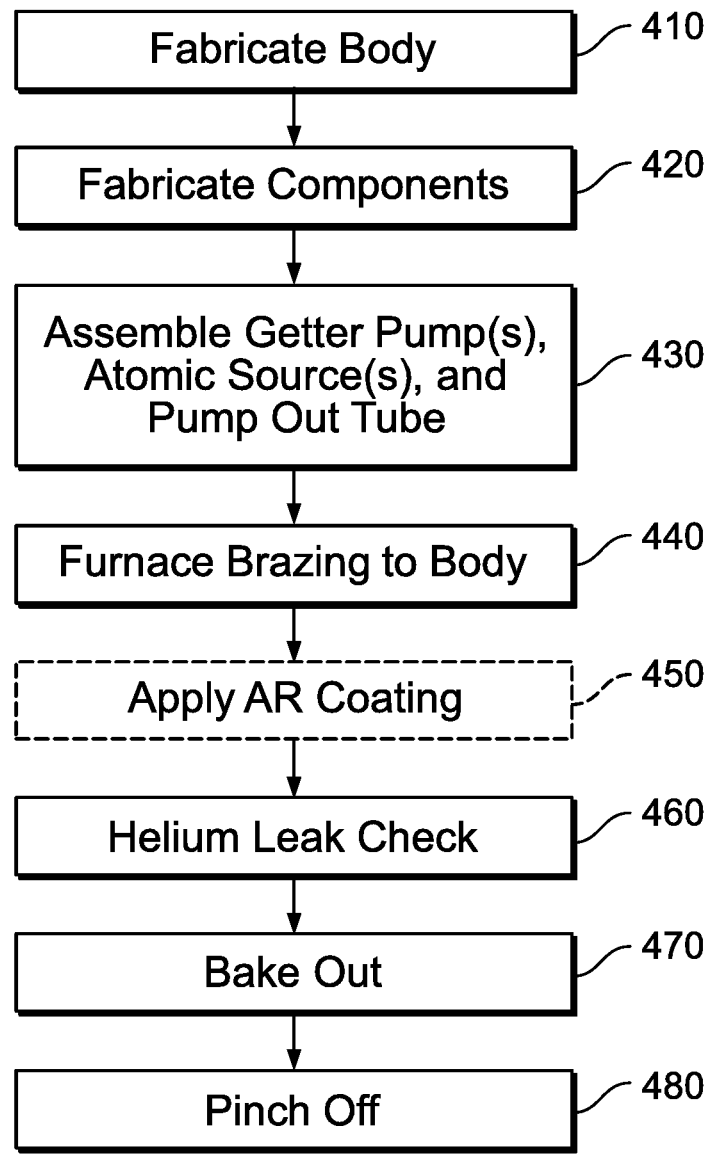
FIG. 4 is a flowchart illustrating the steps in fabricating an exemplary vacuum chamber in accordance with one or more embodiments of the present invention.

FIG. 4 is an exemplary flowchart 400 illustrating the steps in fabricating an exemplary vacuum chamber 100 employing a body 110 made of a polycrystalline ceramic. In step 410, the body 110 is fabricated of a polycrystalline ceramic. In step 420, the various polycrystalline ceramic, titanium, and copper components are fabricated. These components include, for example, various components of the getter-based pump(s) 150, the atomic source(s) 160, the pump out tube 170, and any required plug(s).

In step 430, the getter-based pump(s) 150, the atomic source(s) 160, and the pump out tube 170 are assembled using laser welding for joining titanium components to other titanium components. In step 440, various components, including the window(s) 140, the getter-based pump(s) 150, the atomic source(s) 160, the pump out tube 170, and any required plug(s), are furnace brazed using conventional or active brazing methods to the body 110, with this brazing joining ceramic components to other ceramic components or to titanium components. Conventional braze filler metals are preferably based on gold (Au) or silver (Ag), with the faying surface(s) of the component(s) being metalized prior to brazing. With respect to the window(s) 140, the metallization will preferably be around the perimeter of the face of the window recess(es) 120 and the window(s) 140, as opposed to the rim of the window recess(es) 120 and the edge of the window(s) 140 to minimize potential problems due to differences in CTEs of the materials. Active braze filler metal alloys preferably include, for example, Ag-1Cu-2Zr; Nioro-ABA®, Nicoro+2% Ti®, Cusil-ABA®, and Incusil-ABA®, and are preferably used in the form of a filler metal preform. The filler metal preform may be a wire, a ring, a sheet, a punched sheet, or a paste filler metal. As a result of the furnace brazing in step 440, a corresponding filler metal ring is formed in the window recess(es) 120 and port(s) 130 between the body 110 and each of the window(s) 140, the getter-based pump(s) 150, the atomic source(s) 160, the pump out tube 170, and any required plug(s). In optional step 450, an AR coating is applied to the window(s) 140, for example, via an atomic layer epitaxy process, as the AR coating on traditional AR coated window(s) 140 may not survive the furnace brazing step 440. The fabrication of the vacuum chamber 100 is complete at this point.

In step 460, the completed vacuum chamber 100 is connected to an external vacuum pumping system and subjected to a helium leak check to determine if any leaks are present. In step 470, assuming no leaks were found in step 460, the vacuum chamber 100 undergoes a bake out procedure while being pumped to the desired vacuum level, for example, $10^{-8}$ Torr. The bake out procedure preferably occurs at a temperature of approximately 400° C. to ensure that all surfaces within the vacuum chamber 100 have thoroughly outgassed, though other temperatures may be employed. The bake out procedure may last for as little as a few hours to as long as a few days. In step 480, the pump out tube 170 is sealed, preferably pinched off, and the vacuum chamber 100 removed from the external vacuum pumping system.

As will be appreciated, the order of the fabrication steps in FIG. 4 may be altered, various steps may be combined, and one or more steps may be added or deleted depending upon the specific embodiment of the present invention. Of concern when ordering the fabrication steps is minimizing the amount of time the getter material 220 and especially the atomic dispenser 320 are exposed to high temperatures. For this reason, the order of steps 430 and 440 may be interchanged.

In at least one embodiment of the present invention, a recess frame (not illustrated), preferably formed of titanium, may be brazed into each of the window recesses 120A-

120C. Likewise, a window frame (not illustrated), preferably formed of titanium, may be brazed to a perimeter of each of the windows 140A-140C, with the AR coating applied after brazing. The window frame is then welded to its corresponding facing recess frame using a highly localized welding process, for example, electron beam or laser welding. Because the high temperature required to weld the window frame to its corresponding facing recess frame is highly localized, the temperature the AR coating is exposed to is not sufficient to degrade it. This embodiment therefore offers an alternative to having to deposit an AR coating in optional step 450 after the brazing process used to build the vacuum chamber 100 in step 440.

While the various steps in the flowchart illustrated in FIG. 4 typically employ laser welding or furnace brazing, alternative methods of joining the components may be used, for example, electron beam welding, TIG welding, orbital welding, and spot or resistance welding. Because various types of getter-based pumps 150 and atomic sources 160 have different temperature and air exposure requirements, a combination of joining and sealing techniques may be required. Welding, for example, has very localized heating, limiting the amount of heat deposited in the getter-based pumps 150 and atomic sources 160.

Other embodiments of the present invention may employ alternative ways of sealing the vacuum chamber 100. For example, the vacuum chamber 100 could be sealed with a solder, using a pure metal or alloys of, for example, indium (In), gold (Au), silver (Ag), tin (Sn), germanium (Ge), silicon (Si), etc., in conjunction with a lid. This approach offers the benefit of eliminating the pump out tube 170, and thus eliminating a potential leak source. This approach would employ a large vacuum chamber in which the smaller vacuum chamber 100 would be placed and sealed. After the vacuum chamber 100 is pumped down, baked out, and the getter-based pump(s) activated, a lid could be brought in contact with the vacuum chamber 100 and the solder could be melted to form the seal. Induction heating of the solder may be used to limit the heating of other components, for example, the getter-based pumps 150 and atomic sources 160. It should be noted that the use of solders could limit the bake out temperature of the vacuum chamber 100 depending on which solder is used and how the solder is used.

As will be appreciated by those of ordinary skill in the art, the use of furnace brazing with the alumina body 110 raises several issues not encountered in the prior art where furnace brazing was used to join titanium-based components. For example, the alumina furnace brazing temperature of approximately 950-1050° C. is significantly higher than that required for titanium furnace brazing, which is approximately 750-850° C. This higher required temperature creates a number of potential issues that were avoided in the titanium component-based prior art. For example, the AR coating on the windows may fail at the higher required temperature, with the result that prior art windows are not compatible with various embodiments of the present invention. Further, the higher required temperature will exacerbate any changes in dimensions between components with different CTEs as the change in temperature is that much greater than that encountered with the titanium component-based prior art. These differences in CTE can lead to highly stressed joints that were avoided with the titanium furnace brazing.

Exemplary Vacuum Chamber Applications

A vacuum chamber in accordance with various embodiments of the present invention may have various configurations depending upon the specific application. One of the primary potential applications for the vacuum chamber is for use in atomic interferometry (AI). See, for example, M. Kasevich and S. Chu, "Atomic Interferometry Using Stimulated Raman Transitions," Physical Review Letters, vol. 67, pp. 181-184 (1991), the contents of which are incorporated herein by reference. However, even within AI applications, the specific configuration for the vacuum chamber may be different. For example, in many cold atom AI applications, a magneto-optical trap (MOT) may be formed using six orthogonal and counter-propagating cooling laser beams. See, for example, W. D. Phillips, "Laser cooling and trapping of neutral atoms," Reviews of Modern Physics, vol. 70, pp. 721-741 (1998), the contents of which are incorporated herein by reference. As the six cooling laser beams must be orthogonal and counter-propagating, this will typically require the vacuum chamber to have six corresponding orthogonally placed windows. As an alternative, a single cooling laser beam may be used in conjunction with a two-dimensional grating, thereby reducing the number of windows required for creating the MOT to just one. See, for example, J. A. Rushton et al., "The Feasibility of a Fully Miniaturized Magneto-Optical Trap for Portable Ultracold Quantum Technology," Review of Scientific Instruments, vol. 85, article no. 121501 (2014), the contents of which are incorporated herein by reference. Reducing the number of windows provides the corresponding benefit of reducing the number of potential leak sources.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A sealed, passively pumped vacuum chamber comprising:
a body formed of a polycrystalline ceramic, the body including at least one window recess; and
at least one window, each of the at least one windows formed of a transparent ceramic, each of the at least one windows located in a corresponding one of the at least one window recesses.

2. The sealed, passively pumped vacuum chamber of claim 1, wherein the polycrystalline ceramic used to form the body includes one of an oxide-based ceramic, a nitride-based ceramic, and a carbide-based ceramic.

3. The sealed, passively pumped vacuum chamber of claim 1, wherein the polycrystalline ceramic used to form the body includes 80-99.8% alumina.

4. The sealed, passively pumped vacuum chamber of claim 1, wherein a bottom of each of the at least one window recesses forms a slight angle with respect to a corresponding face of the body, the slight angle adapted to reduce optical reflections.

5. The sealed, passively pumped vacuum chamber of claim 1, wherein the transparent ceramic used to form each of the at least one windows includes one of sapphire, aluminum oxynitride, yttrium oxide, and yttria-alumina garnet.

6. The sealed, passively pumped vacuum chamber of claim 1, wherein each of the at least one windows includes an anti-reflection coating.

7. The sealed, passively pumped vacuum chamber of claim 1, further comprising:

at least one filler metal ring, each of the at least one filler metal rings located between a corresponding one of the at least one window recesses and a corresponding one of the at least one windows;

or at least one window frame, each of the at least one window frames located around a perimeter of a corresponding one of the at least one windows; and at least one recess frame, each of the at least one recess frames located in a corresponding one of the at least one window recesses, each of the at least one recess frames facing a corresponding one of the at least one window frames.

8. The sealed, passively pumped vacuum chamber of claim 1, further comprising at least one getter-based pump.

9. The sealed, passively pumped vacuum chamber of claim 8, wherein each of the at least one getter-based pumps includes an alloy containing one or more of zirconium, aluminum, titanium, vanadium, and iron.

10. The sealed, passively pumped vacuum chamber of claim 8, wherein the body further includes at least one port;

wherein each of the at least one getter-based pumps includes a corresponding tube body, each corresponding tube body being located in a corresponding one of the at least one ports.

11. The sealed, passively pumped vacuum chamber of claim 8, wherein each of the at least one getter-based pumps is located adjacent to an inner surface of the body.

12. The sealed, passively pumped vacuum chamber of claim 8, wherein each of the at least one getter-based pumps is adapted to be activated by at least one of electrical feedthroughs, induction, and light.

13. The sealed, passively pumped vacuum chamber of claim 1, further comprising a pump out tube, the pump out tube adapted to be coupled to an external vacuum pumping system, the pump out tube adapted to be sealed;

wherein the body further includes a port; and wherein the pump out tube is located in the port.

14. The sealed, passively pumped vacuum chamber of claim 13, wherein the pump out tube includes an oxygen-free high thermal conductivity (OFHC) copper tube or a nickel tube.

15. The sealed, passively pumped vacuum chamber of claim 13, wherein the pump out tube further includes a titanium or polycrystalline ceramic sleeve, the titanium or polycrystalline ceramic sleeve located around the exterior of a portion of the pump out tube.

16. The sealed, passively pumped vacuum chamber of claim 1, further comprising a lid;

wherein the body further includes a port; and wherein the lid is solder sealed to the port.

17. The sealed, passively pumped vacuum chamber of claim 1, further comprising at least one atomic source;

wherein the body further includes at least one port; and wherein each of the at least one atomic sources includes a corresponding tube body, each corresponding tube body being located in a corresponding one of the at least one ports.

18. The sealed, passively pumped vacuum chamber of claim 17, wherein each of the at least one atomic sources includes one of aluminum (Al), argon (Ar), calcium (Ca), cesium (Cs), chromium (Cr), dysprosium (Dy), erbium (Er), francium (Fr), helium (He), indium (In), lithium (Li), magnesium (Mg), mercury (Hg), neon (Ne), potassium (K), rubidium (Rb), sodium (Na), strontium (Sr), xenon (Xe), ytterbium (Yb), diiodine ($I_2$), and disodium ($Na_2$).

19. The sealed, passively pumped vacuum chamber of claim 17, wherein each of the at least one atomic sources is adapted to be activated by at least one of electrical feedthroughs, induction, and light.

20. The sealed, passively pumped vacuum chamber of claim 1, further comprising:

at least one of a getter-based pump and an atomic source;

a high-temperature cofired ceramic (HTCC), each of the at least one getter-based pump and atomic source being located adjacent the HTCC, each of the at least one getter-based pump and atomic source being activated by metalized current paths within the HTCC; and a tube body, the HTCC being located in the tube body;

wherein the body further includes a port; and wherein the tube body is located in the port.

* * * * *